(12) United States Patent
Fang et al.

(10) Patent No.: US 11,381,091 B2
(45) Date of Patent: Jul. 5, 2022

(54) PROCESSING CIRCUIT WITH MULTIPLE POWER SUPPLY PORTS AND ELECTRONIC DEVICE

(71) Applicant: SHENZHEN WING SEMICONDUCTOR Co., Ltd., Shenzhen (CN)

(72) Inventors: Rui Fang, Shenzhen (CN); Wenjun Liu, Shenzhen (CN); Yong Zhang, Shenzhen (CN)

(73) Assignee: SHENZHEN WING SEMICONDUCTOR CO., LTD., Shenzhen (CN)

( * ) Notice: Subject to any disclaimer, the term of this patent is extended or adjusted under 35 U.S.C. 154(b) by 0 days.

(21) Appl. No.: 17/323,163

(22) Filed: May 18, 2021

(65) Prior Publication Data

US 2022/0094176 A1    Mar. 24, 2022

(30) Foreign Application Priority Data

Sep. 18, 2020    (CN) .......................... 202010987979.1

(51) Int. Cl.
*H02J 7/10*    (2006.01)
*H02J 7/00*    (2006.01)
*H02M 3/155*    (2006.01)

(52) U.S. Cl.
CPC .......... *H02J 7/0013* (2013.01); *H02M 3/155* (2013.01); *H02J 2207/20* (2020.01)

(58) Field of Classification Search
CPC .. H02J 7/0013; H02J 2207/20; H02J 2207/30; H02M 3/155; H02M 7/00; H02M 1/00

USPC ........................................................... 307/24
See application file for complete search history.

(56) References Cited

U.S. PATENT DOCUMENTS

| | | | | |
|---|---|---|---|---|
| 6,064,554 | A * | 5/2000 | Kim .................... | G06F 1/266 |
| | | | | 361/64 |
| 8,312,199 | B2 * | 11/2012 | Johnson .............. | G06F 13/4022 |
| | | | | 710/16 |
| 9,086,868 | B2 * | 7/2015 | Shiba .................. | G06F 13/4068 |
| 9,864,421 | B2 * | 1/2018 | Li ......................... | G06F 1/26 |
| 10,574,070 | B1 * | 2/2020 | Li .......................... | H02J 7/022 |
| 10,873,181 | B2 * | 12/2020 | Tsujii ................... | H02H 3/243 |
| 10,976,798 | B2 * | 4/2021 | Basterash ............. | G06F 1/266 |
| 11,151,069 | B2 * | 10/2021 | Pan ...................... | G06F 13/4022 |

(Continued)

*Primary Examiner* — Ryan Jager
(74) *Attorney, Agent, or Firm* — NZ Carr Law Office

(57) ABSTRACT

The invention provides a processing circuit with multiple power supply ports and an electronic device. The processing circuit includes: N power supply ports; a first-level power supply; N middle transmission modules, connected between the first-level power supply and the corresponding power supply port, wherein at least one of which is used as a second-level power supply; and a charging protocol control module. The charging protocol control module is respectively connected to the first-level power supply, the N power supply ports, and the N middle transmission modules. The second-level power supply operates in a switching power mode or a pass through mode. In the pass through mode, the output voltage of the second-level power supply matches the input voltage received by the first-level power supply, and the output voltage of the second-level power supply is not adjustable.

20 Claims, 6 Drawing Sheets

(56) References Cited

U.S. PATENT DOCUMENTS

| | | | |
|---|---|---|---|
| 2010/0060081 A1* | 3/2010 | Cheong | H01R 13/6675 |
| | | | 307/66 |
| 2010/0146307 A1* | 6/2010 | Griffin, Jr. | G06F 1/263 |
| | | | 713/300 |
| 2011/0018344 A1* | 1/2011 | Liao | G06F 1/266 |
| | | | 307/31 |
| 2012/0081087 A1* | 4/2012 | Ching-Wei | G06F 1/266 |
| | | | 323/282 |
| 2013/0132758 A1* | 5/2013 | Shiba | G06F 1/28 |
| | | | 713/340 |
| 2018/0364779 A1* | 12/2018 | Shpiro | G06F 13/409 |
| 2019/0341793 A1* | 11/2019 | Chien | H01R 25/006 |
| 2020/0014228 A1* | 1/2020 | Chien | F21V 33/0048 |
| 2020/0091746 A1* | 3/2020 | Chien | H02J 4/00 |
| 2021/0002170 A1* | 1/2021 | Chien | C03B 27/012 |
| 2021/0109580 A1* | 4/2021 | Tseng | G06F 13/4282 |

\* cited by examiner

PROCESSING CIRCUIT WITH MULTIPLE POWER SUPPLY PORTS AND ELECTRONIC DEVICE

CROSS REFERENCE TO THE RELATED APPLICATIONS

This application is based upon and claims priority to Chinese Patent Application No. 202010987979.1, filed on Sep. 18, 2020, the entire contents of which are incorporated herein by reference.

FIELD OF THE INVENTION

The present invention relates to the field for supplying power, particularly to a processing circuit with multiple power supply ports and an electronic device.

BACKGROUND OF THE INVENTION

In electronic devices that can supply external power (such as a power adapter with a single USB power supply port), an AC-to-DC switching power supply is used to convert the AC voltage into a DC voltage to supply power to a single port. However, with the diversification of requirements, electronic devices may be equipped with multiple power supply ports (e.g., USB power supply ports).

In the prior art, an electronic device with multiple power supply ports (such as power adapters) is used. When each port requires independent power supply, a two-stage power supply architecture is generally used to generate multiple voltages. The first stage uses an AC-to-DC switching power supply to convert the AC voltage into a transitional DC voltage. The second stage uses a DC-to-DC switching power supply to convert the transitional DC voltage into a DC voltage required by the port.

However, the two-stage power supply architecture will produce extra power conversion loss, which will cause the device to heat up, thereby resulting in a higher operating temperature.

SUMMARY OF THE INVENTION

The present invention provides a processing circuit with multiple power supply ports and an electronic device to solve the problem with higher working temperature due to a fact that a device heats up.

According to a first aspect of the present invention, a processing circuit with multiple power supply ports is provided, which comprises N power supply ports, a first-level power supply, N middle transmission modules, and a charging protocol control module, wherein N is an integer larger than or equal to 2;
  the middle transmission module is connected between the first-level power supply and the corresponding power supply port, at least one of the middle transmission modules is used as a second-level power supply, and the charging protocol control module is respectively connected to the first-level power supply, the N power supply ports, and the N middle transmission modules;
  the second-level power supply operates in a switching power mode or a pass through mode;
  wherein in the switching power mode, an output voltage of the second-level power supply is less than an input voltage received by the first-level power supply, and the output voltage of the second-level power supply is adjustable;
  wherein in the pass through mode, an output voltage of the second-level power supply matches an input voltage received by the first-level power supply, and the output voltage of the second-level power supply is not adjustable;
  wherein when a $1^{st}$ second-level power supply of at least one second-level power supply is connected to a first device that needs electricity through the corresponding power supply port and the remaining middle transmission modules are not connected to a device that needs electricity through the corresponding power supply ports, the charging protocol control module controls the $1^{st}$ second-level power supply to operate in the pass through mode and adjusts an output voltage of the first-level power supply according to power supply requirements of the first device.

In an embodiment, when the charging protocol control module controls the $1^{st}$ second-level power supply to operate in the pass through mode, the charging protocol control module turns off the remaining middle transmission modules, such that the corresponding power supply ports do not receive electricity of the first-level power supply.

In an embodiment, the charging protocol control module comprises at least one charging protocol control unit respectively connected to the first-level power supply, a corresponding second-level power supply, and a power supply port corresponding to the second-level power supply;
  a first control unit of the at least one charging protocol control unit is configured to determine device-access states of the N power supply ports, wherein the device-access states determine whether the corresponding power supply ports are connected to devices requiring power supply;
  when the power supply port connected to the first control unit is connected to the first device and remains of the N power supply ports are not connected to devices requiring power supply, the first control unit controls a second-level power supply connected to the first control unit to operate in the pass through mode and adjusts an output voltage of the first-level power supply according to power supply requirements of the first device.

In an embodiment, when the first control unit determines device-access states of the N power supply ports and when the power supply port connected to the first control unit and another of the N power supply ports are respectively connected to different devices requiring power supply, the first control unit controls a second-level power supply connected to the first control unit to operate in the switching power mode, obtains a present demand of supplying electricity, and adjusts an output voltage of a second-level power supply connected to the first control unit according to the present demand of supplying electricity, wherein the present demand of supplying electricity represents a demand of supplying electricity of a device connected to the first control unit through the power supply port.

In an embodiment, the first control unit directly obtains device-access states of at least a part of the power supply ports from the corresponding power supply port.

In an embodiment, the first control unit obtains device-access states of a part of the power supply ports from a remaining charging protocol control unit.

In an embodiment, the number of the second-level power supply is multiple, and when two $2^{nd}$ second-level power supplies of multiple second-level power supplies are respectively connected to different second devices requiring power supply through the corresponding power supply ports, the charging protocol control module controls the two $2^{nd}$ second-level power supplies to operate in the switching power mode and adjusts an output voltage of the corresponding second-level power supply according to electricity that the second device needs.

In an embodiment, at least one middle transmission module of the N middle transmission modules is a switching module configured to turn on or turn off between the first-level power supply and the corresponding power supply port, and when one target-switching module of at least one switching module is connected to a third device that needs electricity through the corresponding power supply port, the charging protocol control module turns on the target-switching module and adjusts an output voltage of the first-level power supply according to electricity that the third device needs.

In an embodiment, the target-switching module is connected to the third device and a $3^{rd}$ second-level power supply of at least one second-level power supply is connected to a fourth device that needs electricity, the charging protocol control module controls the $3^{rd}$ second-level power supply to operate in the switching power mode and adjusts an output voltage of the $3^{rd}$ second-level power supply to a fixed voltage.

In an embodiment, the fixed voltage is determined by a minimum power voltage that a device needs.

In an embodiment, the charging protocol control module comprises at least one charging protocol control unit, a second control unit of the at least one charging protocol control unit is connected to a second-level power supply and a switching module, the second control unit is configured to determine device-access states of the N power supply ports, the device-access states determine whether the corresponding power supply ports are connected to devices requiring power supply, and when the switching module connected to the second control unit is connected to the third device through the corresponding power supply port, the second control unit turns on the switching module connected to the second control unit and adjusts an output voltage of the first-level power supply according to electricity that the third device needs.

In an embodiment when the second control unit determines device-access states of the N power supply ports, the switching module connected to the second control unit is connected to the third device that needs electricity, the second-level power supply connected to the second control unit is connected to a fourth device that needs electricity, the second control unit controls the second-level power supply connected the second control unit to operate in the switching power mode and adjusts an output voltage of the second-level power supply connected to the second control unit to a fixed voltage.

In an embodiment, the second-level power supply comprises a voltage conversion controller, a first switch, a second switch, an inductor, and a capacitor;

the voltage conversion controller is connected to the charging protocol control module, a control terminal of the first switch, and a control terminal of the second switch, a first terminal of the first switch is connected to an output of the first-level power supply, a second terminal of the first switch is connected to a first terminal of the inductor, a second terminal of the inductor and a first terminal of the capacitor are connected to the corresponding power supply ports, a first terminal of the second switch is connected to the first terminal of the inductor, and a second terminal of the second switch is connected to a second terminal of the capacitor;

when the second-level power supply operates in the switching power mode, the first switch and the second switch are controlled to be turned on or turned off, and ON time of the first switch and the second switch matches corresponding requirement for supplying electricity;

when the second-level power supply operates in the pass through mode, the first switch keeps to be turned on and the second switch keeps to be turned off.

According to a second aspect of the present invention, an electronic device comprising the processing circuit with multiple power supply ports of the first aspect and the embodiments is provided.

In the processing circuit with multiple power supply ports and the electronic device of the present invention, the second-level power supply operates in the switching power mode or the pass through mode. In the pass through mode, the output voltage of the second-level power supply matches the input voltage received by the first-level power supply, and the output voltage is not adjustable. Thus, in the pass through mode, the second-level power supply cannot produce the switching loss of voltage conversion and corresponding heat. In the present invention, when the power supply port of a single second-level power supply works, the second-level power supply is immediately controlled to operate in the pass through mode. Besides, the first-level power supply is controlled to satisfy the requirement for supplying electricity. As a result, the present invention can immediately and precisely implement the switching activity, effectively satisfy the requirement for supplying electricity, and decrease loss and heat.

BRIEF DESCRIPTION OF THE DRAWINGS

Below, the embodiments are described in detail in cooperation with the drawings to make easily understood the technical contents, characteristics and accomplishments of the present invention. Obviously, the drawings in the following description are only some embodiments of the present invention. For those of ordinary skill in the art, other drawings can be obtained based on these drawings without creative labor.

DESCRIPTION OF REFERENCE NUMERALS

1—first-level power supply;
2—middle transmission module;

21—second-level power supply;
211—voltage conversion controller;
22—switching module;
3—power supply port;
31—USB power supply port;
4—charging protocol control module;
41—charging protocol control unit;
Q1—first switch;
Q2—second switch;
Q3—third switch;
L—inductor;
C—capacitor.

DETAILED DESCRIPTION OF THE EMBODIMENTS

The technical implementations in the embodiments of the present invention will be clearly and completely described below in cooperation with the accompanying drawings in the embodiments of the present invention. Obviously, the described embodiments are only a part of the embodiments of the present invention, rather than all the embodiments. Based on the embodiments of the present invention, all other embodiments obtained by those of ordinary skill in the art without creative work shall fall within the protection scope of the present invention.

The terms "first", "second", "third", "fourth", etc. (if any) in the description and claims of the present invention and the above-mentioned drawings are used to distinguish similar objects, but not necessarily describe a specific order. It should be understood that the data used in this way can be interchanged under appropriate circumstances so that the embodiments of the present invention described herein can be implemented in a sequence other than those illustrated or described herein. In addition, the terms "include" and "have" and any variations of them are intended to cover non-exclusive inclusion. For example, a process, method, system, product or device that includes a series of steps or units is not necessarily limited to the clearly listed steps or units. Those steps or units may include other steps or units that are not clearly listed or are inherent to these processes, methods, products, or equipment.

The technical implementation of the present invention will be described in detail below with specific embodiments. The following specific embodiments can be combined with each other, and the same or similar concepts or processes may not be repeated in some embodiments.

Figure 1:
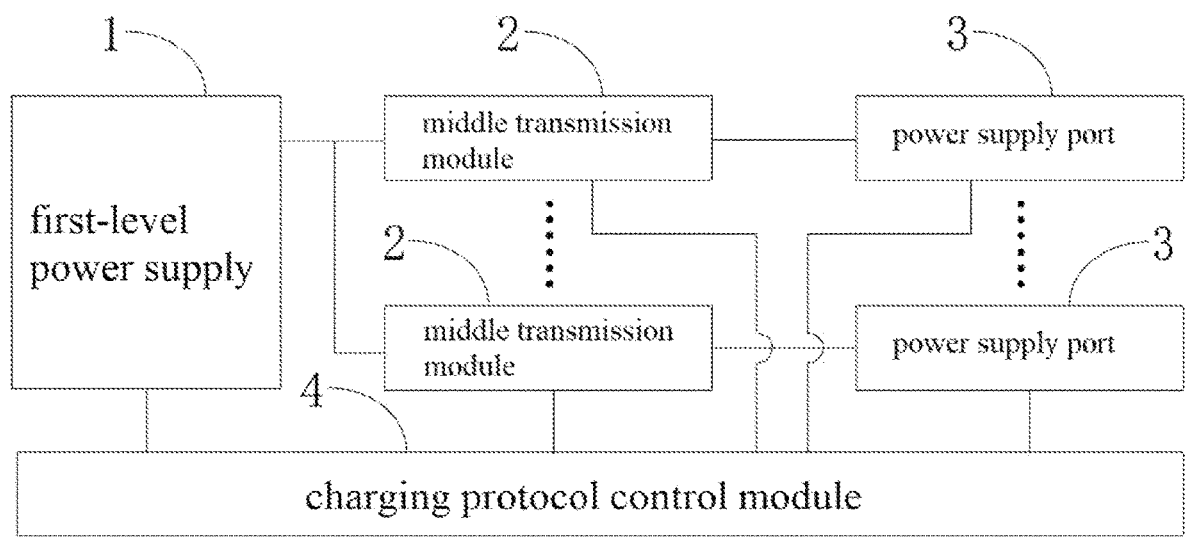
FIG. 1 is a diagram schematically illustrating a processing circuit with multiple power supply ports according to an embodiment of the present invention.
Figure 2:
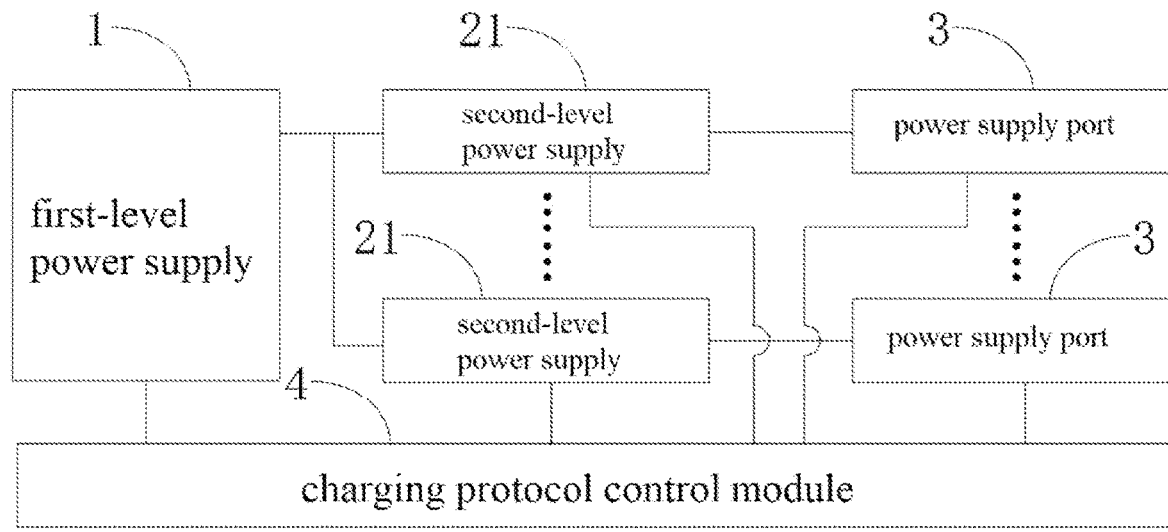
FIG. 2 is a diagram schematically illustrating a processing circuit with multiple power supply ports according to an embodiment of the present invention.
Figure 3:
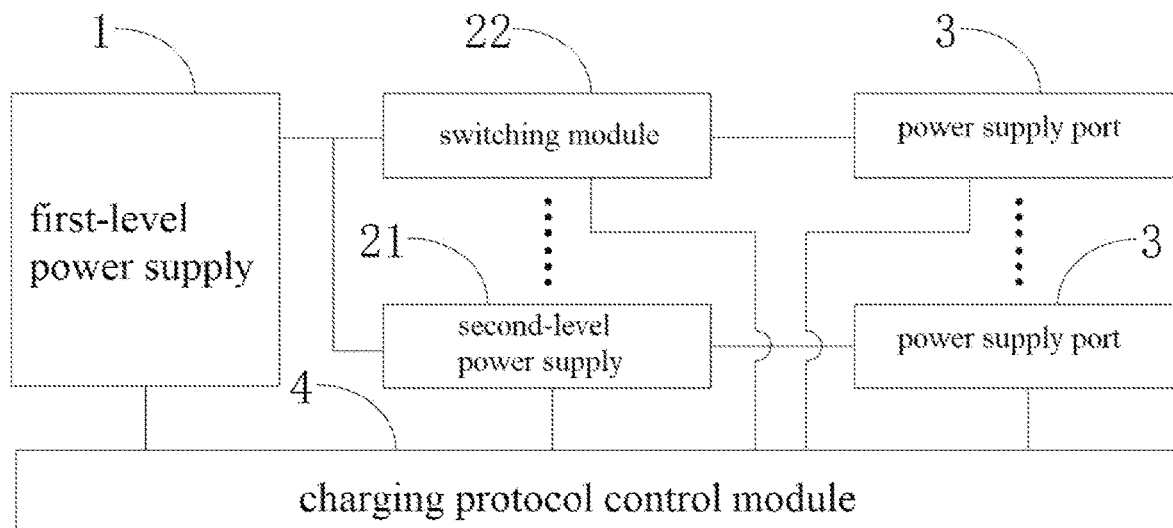
FIG. 3 is a diagram schematically illustrating a processing circuit with multiple power supply ports according to an embodiment of the present invention.

Referring to FIGS. 1-3, a processing circuit with multiple power supply ports comprising N power supply ports 3, a first-level power supply 1, N middle transmission modules 2, and a charging protocol control module 4, wherein N is an integer larger than or equal to 2.

The first-level power supply 1 can convert an alternate-current (AC) voltage into a direct-current (DC) voltage. The output voltage of the first-level power supply 1 is adjustable (e.g., the charging protocol control module 4 adjusts the output voltage).

The middle transmission module 2 is connected between the first-level power supply 1 and the corresponding power supply port 3. Each middle transmission module 2, connected to the output of the first-level power supply, receives the same voltage from the first-level power supply 1 (i.e., the input voltage of the middle transmission module 2). In some embodiments, each middle transmission module 2 may receive different voltages from the first-level power supply 1.

Referring to FIGS. 2-3, at least one middle transmission module of the N middle transmission modules 2 is used as a second-level power supply 21. The remaining middle transmission modules 2 that are not used as the second-level power supplies 21 may include switching modules 22 or other circuit modules that can transmit power.

The charging protocol control module 4 is respectively connected to the first-level power supply 1, the N power supply ports 3, and the N middle transmission modules 2. Since the charging protocol control module 4 is connected to the first-level power supply 1, the charging protocol control module 4 implements, but not limited to, control on the first-level power supply 1. Since the charging protocol control module 4 is connected to the power supply port 3, the charging protocol control module 4 can implement interaction on the connected device to obtain the device-access state, the requirement for supplying power to devices, etc. Any interaction can be implemented based on the content of the charging protocol.

If the power supply port is a universal serial bus (USB) power supply port, the corresponding protocol is a USB protocol. If the power supply port is another port, the corresponding protocol may also change accordingly. Any port and protocol are included within the scope of the present invention.

Besides, the device-access state is detected and determined by retrieving electrical signals (e.g., voltage and current).

The requirements for supplying electricity include, for example, charging requirements for fast charging and charging requirements for normal charging. Different charging requirements can correspond to different parameters for supplying electricity (e.g., at least one of voltage, current, and power). The requirements for supplying electricity may be related to values or ranges of parameters for supplying electricity. Due to different charging and discharging processes, the parameters for supplying electricity can be changed. Any requirements for supplying electricity are included within the scope of the present invention.

In an embodiment of the present invention, the second-level power supply 21 operates in a switching power mode or a pass through mode.

In the switching power mode, the output voltage of the second-level power supply 21 is less than the input voltage received by the first-level power supply, wherein the output voltage is adjustable. That is to say, the second-level power supply 21 in the switching power mode can step down and output the voltage transmitted from the first-level power supply. Specifically, the step-down amplitude of the voltage can be adjusted by the charging protocol control module 4.

In the pass through mode, the output voltage of the second-level power supply matches the input voltage received by the first-level power supply, wherein the output voltage is not adjustable. "Match" means that the second-level power supply does not perform a controllable step-down conversion on the voltage transmitted from the first-level power supply (the controllable step-down conversion is performed using the charging protocol control module 4 rather than resistors).

Thus, in the foregoing embodiments, the second-level power supply does not cause loss and corresponding heat due to voltage conversion in the pass through mode.

When a $1^{st}$ second-level power supply of at least one second-level power supply is connected to a first device that needs electricity through the corresponding power supply port and the remaining middle transmission modules (may include the second-level power supply 21 and a switching module 22) are not connected to a device that needs electricity through the corresponding power supply ports, the charging protocol control module 4 controls the $1^{st}$ second-level power supply to operate in the pass through mode and adjusts the output voltage of the first-level power supply according to power supply requirements of the first device.

The device that needs electricity refers to a device connected to the power supply port, especially a device that drives the power supply port to operate. Assume that the power supply port is only connected to a data cable. Although the data cable can be viewed as a device, the data cable is not viewed as a device that needs electricity and connects to the data cable.

In the foregoing embodiments, when the power supply port of a single second-level power supply operates, the second-level power supply immediately operates in the pass through mode and the first-level power supply is controlled to satisfy the requirement for supplying electricity. As a result, the present invention can immediately implement the switching activity in order to effectively satisfy the requirement for supplying electricity and decrease loss and heat.

In the pass through mode, the remaining power supply ports are not connected to devices requiring power supply. The remaining middle transmission modules are controlled not to transmit electricity, thereby reducing loss and heat. Accordingly, when the charging protocol control module 4 controls the $1^{st}$ second-level power supply to operate in the pass through mode, the charging protocol control module 4 turns off the remaining middle transmission modules, such that the corresponding power supply port does not receive electricity provided by the first-level power supply 1.

In an embodiment, the number of the second-level power supply 21 is multiple. In an example of FIG. 2, the embodiment shows two second-level power supplies 21, but the present invention is not limited thereto.

When two $2^{nd}$ second-level power supplies of multiple second-level power supplies are respectively connected to different second devices requiring power supply through the corresponding power supply ports, the charging protocol control module 4 controls the two $2^{nd}$ second-level power supplies to operate in the switching power mode and adjusts the output voltage of the corresponding second-level power supply according to electricity that the second device needs.

Simultaneously, the output voltage of the first-level power supply 1 is adjusted to a first fixed voltage. The first fixed voltage is higher than the maximum supplying voltage for charging a device. For example, if the supplying voltage for charging a device has a range of 5-20 volts, the voltage of the first-level power supply 1 is at least higher than 20 volts (e.g., 24 volts).

In an embodiment, the charging protocol control module 4 is configured to obtain the output power of each power supply port, thereby adjusting the output power of each second-level power supply. For example, the charging protocol control module 4 controls the total output power of all the power supply ports to keep unchanged or vary within a specific range.

Figure 4:
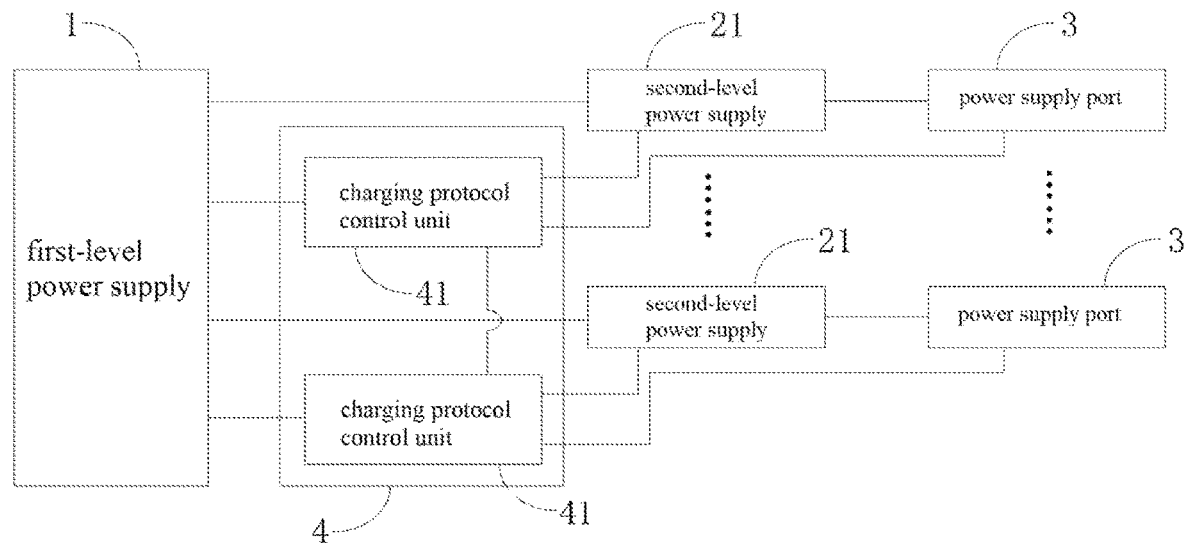
FIG. 4 is a diagram schematically illustrating a processing circuit with multiple power supply ports according to an embodiment of the present invention.
Figure 5:
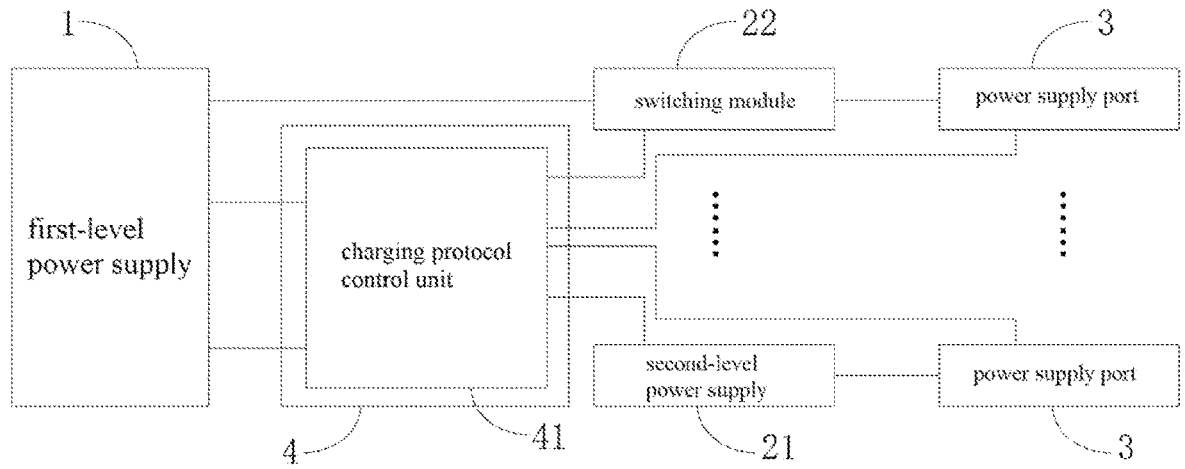
FIG. 5 is a diagram schematically illustrating a processing circuit with multiple power supply ports according to an embodiment of the present invention.

Referring to FIG. 4 and FIG. 5, the charging protocol control module 4 includes at least one charging protocol control unit 41. The charging protocol control unit 41 is respectively connected to the first-level power supply 1, the corresponding second-level power supply 21, and the power supply port 3 corresponding to the second-level power supply 21.

If the number of the charging protocol control units 41 is multiple, the charging protocol control units 41 are integrated in a chip or respectively arranged in different chips. The charging protocol control units 41 can communicate with each other. For example, the charging protocol control unit 41 may be connected to one or more charging protocol control units 41. For another example, each charging protocol control unit 41 may be connected to the same communication bus or communication circuit.

Since the charging protocol control unit 41 is connected to the first-level power supply 1, the first-level power supply is controlled, but the present invention is not limited thereto. Since the charging protocol control unit 41 is connected to the power supply port 3, the charging protocol control unit 41 can interact with the connected device to obtain the device-access state and the requirement for supplying electricity to devices.

For supplying electricity to the first device, a first control unit of the at least one charging protocol control unit 41 is configured to:

determine device-access states of the N power supply ports, wherein the device-access states determine whether the corresponding power supply ports are connected to devices requiring power supply;

when the power supply port connected to the first control unit and remains of the N power supply ports are not connected to devices requiring power supply, the first control unit controls a second-level power supply connected to the first control unit to operate in the pass through mode and adjusts an output voltage of the first-level power supply according to power supply requirements of the first device.

Wherein, the first control unit directly obtains device-access states of a part of the power supply ports from the corresponding power supply port. For example, the device-access states are received from the device based on the USB protocol or retrieved by detecting parameters of the ports.

The first control unit obtains device-access states of a part of the power supply ports from the other charging protocol control units. In other words, the device-access states are obtained by directly or indirectly communicating with the charging protocol control units. For example, a charging protocol unit can directly obtain the device-access state of the corresponding power supply port from the corresponding power supply port and directly or indirectly transmit the device-access state to the other charging protocol control units.

Any way to obtain the device-access state is included within the scope of the present invention.

In an embodiment, as illustrated in FIG. 4, the number of the second-level power supplies 21 is multiple. For supplying electricity to the second device, when the first control unit determines device-access states of the N power supply ports and when the power supply port connected to the first control unit and another of the N power supply ports are respectively connected to different devices requiring power supply (in such a case, each power supply port is connected to the second device described previously), the first control unit controls a second-level power supply connected to the first control unit to operate in the switching power mode. Simultaneously, the charging protocol control unit corresponding to another power supply port controls the corresponding second-level unit to operate in the switching power mode based on the same reason;

the first control unit obtains the present demand of supplying electricity, and adjusts the output voltage of a second-level power supply connected to the first control unit according to the present demand of supplying electricity, wherein the present demand of supplying electricity represents the demand of supplying electricity of a device connected to the first control unit through the power supply port. For example, the demand of supplying electricity is determined by interaction between the charging protocol control unit and the device. For the meaning and examples of requirements for supplying electricity, please refer to the previous descriptions.

In an embodiment, as illustrated in FIG. 3, at least one middle transmission module 2 of the N middle transmission modules 2 is a switching module 22 configured to turn on or turn off the first-level power supply and the corresponding power supply port. For example, a switch in the switching module 22 may be is connected to the first-level power supply 1 and the corresponding power supply port in series. The control terminal of the switch is connected to the charging protocol control module 4. The switch may be connected to other components in series or in parallel.

When one target-switching module of at least one switching module is connected to a third device that needs electricity through the corresponding power supply port, the charging protocol control module 4 turns on the target-switching module and adjusts the output voltage of the first-level power supply according to electricity that the third device needs.

For the meaning and examples of requirements for supplying electricity, please refer to the previous descriptions.

In the foregoing embodiments, since the switching module does not adjust the output voltage, the output voltage of the first-level power supply is adjusted to satisfy the requirement for supplying electricity.

In order to supply electricity to only the third device, the remaining middle transmission modules are turned off.

In an embodiment, when the target-switching module is connected to the third device and a $3^{rd}$ second-level power supply of at least one second-level power supply is connected to a fourth device that needs electricity (i.e., the switching module and the second-level power supply need to supply electricity to outside through the power supply ports), the charging protocol control module 4 controls the $3^{rd}$ second-level power supply to operate in the switching power mode and adjusts the output voltage of the $3^{rd}$ second-level power supply to a second fixed voltage.

Wherein, the second fixed voltage is determined by the minimum power voltage that a device needs. For example, when the target-switching module is turned on, the output voltage of the corresponding power supply port has a range of 5-20 volts. Simultaneously, the second fixed voltage can be maintained at the minimum power voltage (e.g., about 5 volts) or less than the minimum power voltage. Regardless of the value of the first-level voltage changing with demand, the second-level power supply can generate the second fixed voltage.

Referring to FIG. 5, a second control unit of the at least one charging protocol control unit 41 is respectively connected to a second-level power supply 21 and a switching module 22 in order to supply electricity to the third device.

The second control unit is configured to determine device-access states of the N power supply ports, the device-access states determine whether the corresponding power supply ports are connected to device that need electricity;

when the switching module connected to the second control unit is connected to the third device through the corresponding power supply port, the second control unit turns on the switching module connected to the second control unit and adjusts the output voltage of the first-level power supply according to electricity that the third device needs.

For supplying electricity to the third device and the fourth device, the second control unit performs the following operation:

when the second control unit determines device-access states of the N power supply ports, the switching module connected to the second control unit is connected to the third device that needs electricity, the second-level power supply connected to the second control unit is connected to the fourth device that needs electricity, the second control unit controls the second-level power supply connected the second control unit to operate in the switching power mode and adjusts an output voltage of the second-level power supply connected to the second control unit to a second fixed voltage.

Figure 6:
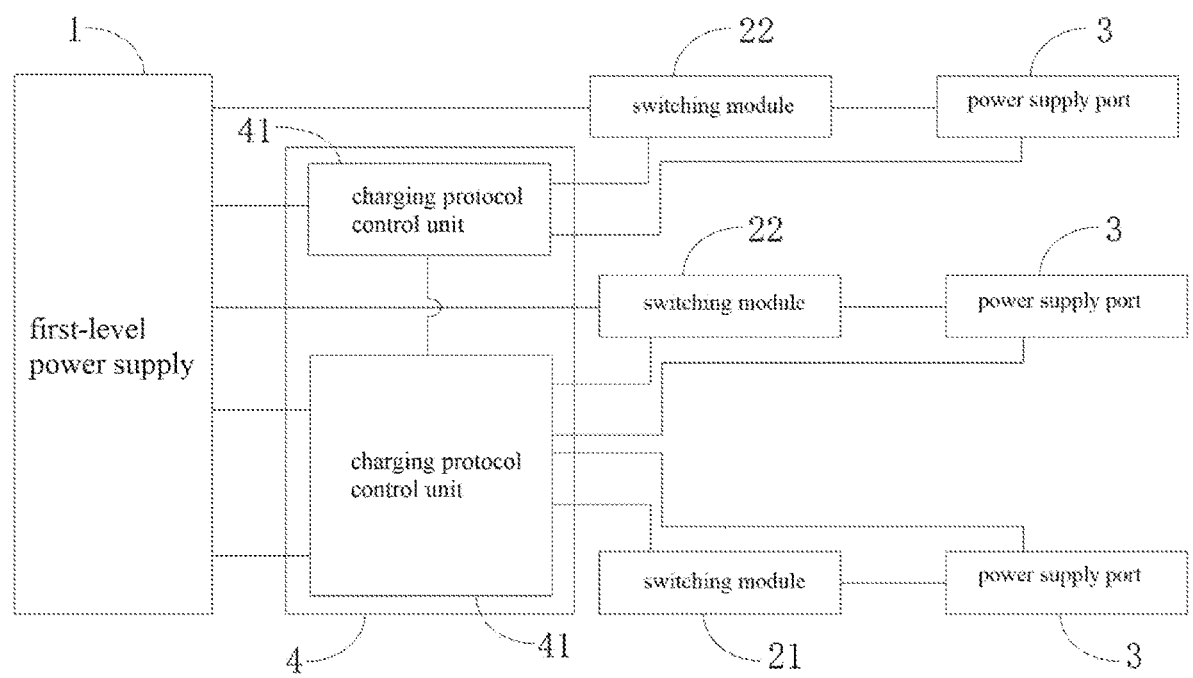
FIG. 6 is a diagram schematically illustrating a processing circuit with multiple power supply ports according to an embodiment of the present invention.

In addition, in the embodiment of FIG. 6, when at least one middle transmission module includes two switching modules 22 and a second-level power supply 21, different switching modules can be controlled by different charging protocol control units (i.e., different switching modules 22 are connected to different charging protocol control units). The number and the connection of the switching modules 22, the second-level power supply 21, and the charging protocol control unit 41 are not limited to all the figures.

Figure 7:
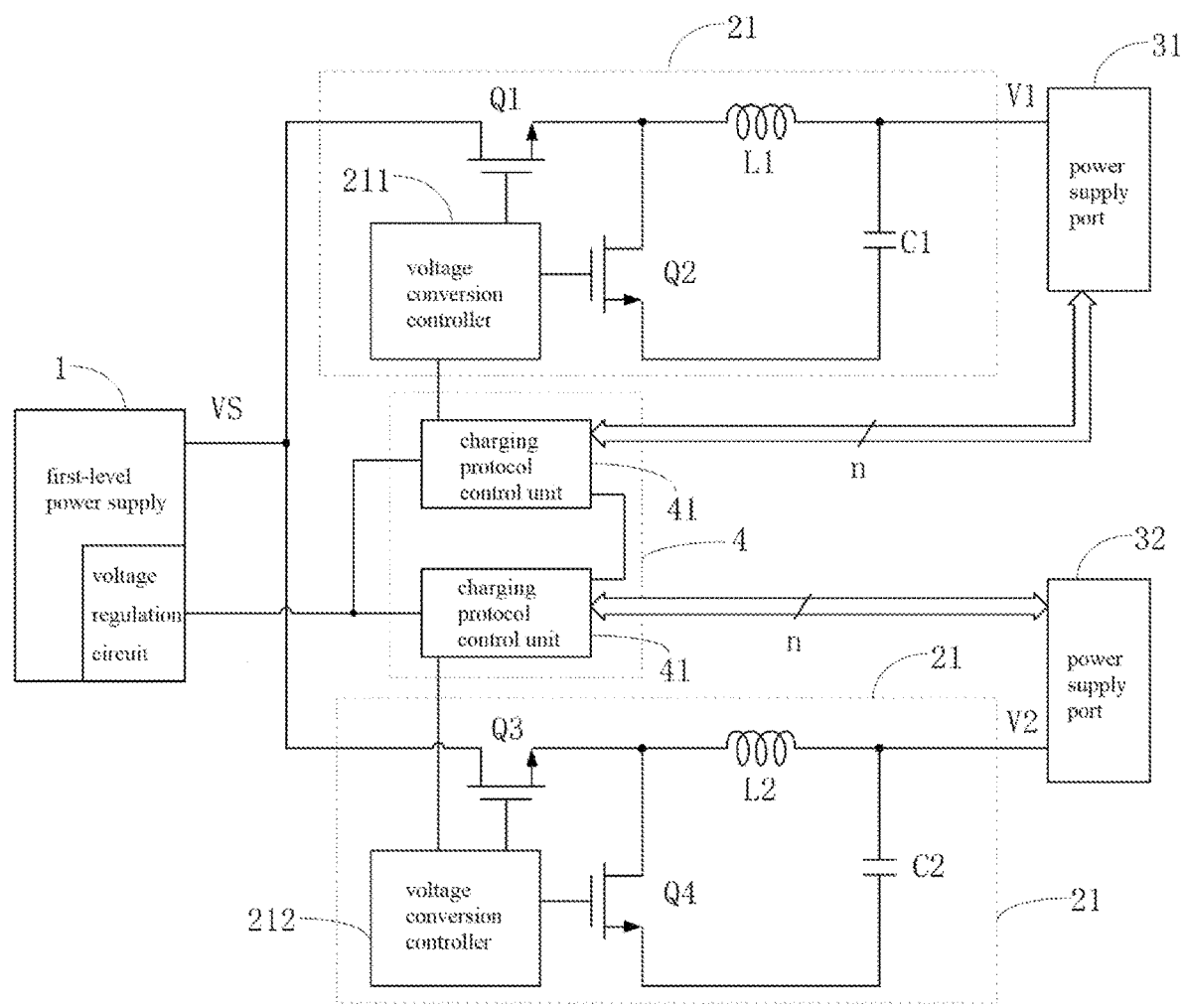
FIG. 7 is a diagram schematically illustrating a processing circuit with multiple power supply ports according to an embodiment of the present invention.

Referring to FIG. 6 and FIG. 7, the second-level power supply 21 includes a voltage conversion controller (e.g., voltage conversion controllers 211 and 212), a first switch (e.g., first switches Q1 and Q3), a second switch (e.g., second switches Q2 and Q4), an inductor (e.g., inductors L1 and L2), and a capacitor (e.g., capacitors C1 and C2).

The voltage conversion controller can be specifically described as a DC/DC conversion controller, which can be understood as any device or a set of devices that can convert the input voltage into an output voltage by controlling the switch.

The voltage conversion controller is connected to the charging protocol control module 4 (such as connecting to the corresponding charging protocol control module 41), the control terminal of the first switch, and the control terminal of the second switch. The first terminal of the first switch is connected to the output of the first-level power supply 1. The second terminal of the first switch is connected to the first terminal of the inductor. The second terminal of the inductor and the first terminal of the capacitor are connected to the corresponding power supply ports 3 (such as a USB power supply port). The charging protocol control unit may be connected to the power supply port 3 through a single cable or more cables. The first terminal of the second switch is connected to the first terminal of the inductor L. The second terminal of the second switch is connected to the second terminal of the capacitor.

When the second-level power supply operates in the switching power mode, the first switch and the second switch are controlled to be turned on or turned off. The ON time of the first switch and the second switch matches the corresponding requirement for supplying electricity. That is to say, when the second-level power supply is adjusted according to the requirement for supplying electricity, the first switch and the second switch are controlled to be turned on or turned off according to the requirement for supplying electricity.

When the second-level power supply 21 operates in the pass through mode, the first switch keeps to be turned on and the second switch keeps to be turned off.

An example of the processing circuit with multiple power supply ports will be described below in cooperation with FIG. 7. The processing circuit in FIG. 7 can be understood as an implemented circuit of FIG. 4.

Referring to FIG. 7, the first-level power supply 1 is an AC-to-DC converter. The first-level power supply 1 includes a voltage regulation circuit. The operation of the voltage regulation circuit can refer to an example of a circuit of the second-level power supply. The output voltage of the first-level power supply is represented as an output voltage VS.

The two second-level power supplies 21 are DC-to-DC converters. The two second-level power supplies 21 respectively supply electricity to two power supply ports 3 (e.g., USB power supply ports 31 and 32 in the figure).

The capacitor and the inductor of the second-level power supply 21 can form a filtering network. The output voltages of the second-level power supplies 21 are represented as output voltages V1 and V2.

The charging protocol control unit 41 is also implemented with a charging protocol controller responsible for the charging protocol of the USB power supply port. The charging protocol control unit 41 can control the voltage conversion controller 211 and adjust the output voltage VS of the first-level power supply 1. The charging protocol control unit 41 further communicates with the charging protocol controller 2. The charging protocol control units 41 also communicate with each other.

When the USB power supply port 31 operates and the USB power supply port 32 does not operate, the charging protocol control unit 41 connected to the USB power supply port 32 turns off the second-level power supply 21 through the voltage conversion controller 212. The first switch Q3 and the second switch Q4 are turned off. The charging protocol control unit 41 connected to the USB power supply port 31 turns on the first switch Q1 and turns off the second switch Q2 through the voltage conversion controller 211. The second-level power supply 21 connected to the USB power supply port 31 operates in the pass through mode. Simultaneously, the output voltage and the input voltage of the second-level power supply 21 are equal. In other words, V1=VS. According to the voltage that the USB power supply port 31 needs (i.e., the requirement for supplying electricity), the charging protocol control unit 41 connected to the USB power supply port 31 adjusts the output voltage VS of the first-level power supply 1 through the voltage regulation circuit of the first level power supply 1.

When the USB power supply ports 31 and 32 both operate, two charging protocol control units both adjust the output voltage of the first-level power supply to a fixed voltage (e.g., the first fixed voltage described previously). For example, VS=24V. Then, the charging protocol control unit 41 connected to the USB power supply port 31 controls the voltage conversion controller 211 to operate in the switching power mode. At this time, V1=VS*D1. D1 is a duty cycle used by the voltage conversion controller 211. The charging protocol control unit 41 connected to the USB power supply port 32 controls the voltage conversion controller 212 to operate in the switching power mode. At this time, V2=VS*D2. D2 is a duty cycle used by the voltage conversion controller 212.

Figure 8:
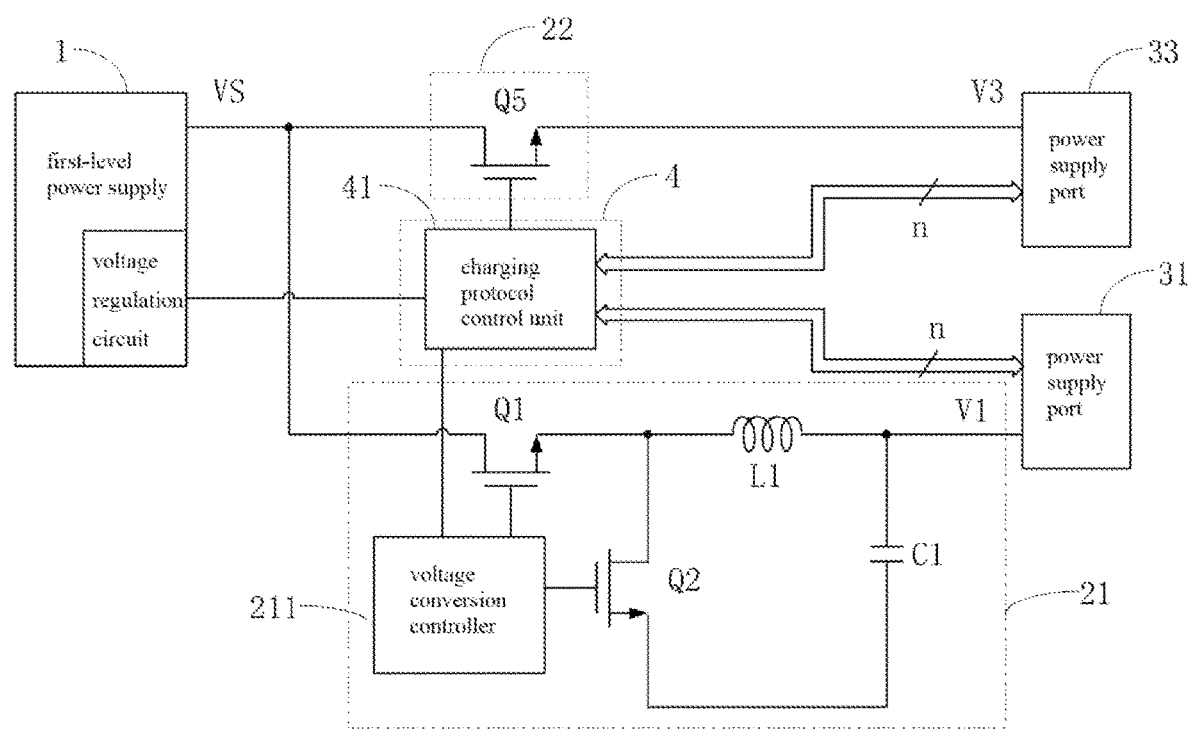
FIG. 8 is a diagram schematically illustrating a processing circuit with multiple power supply ports according to an embodiment of the present invention.

An example of the processing circuit with multiple power supply ports will be described below in cooperation with FIG. 8. The processing circuit in FIG. 8 can be understood as an implemented circuit of FIG. 5.

When the USB power supply port 31 operates and the USB power supply port 33 does not operate, the charging protocol control unit 41 turns off the switch Q5 of the switching module 22 (the switch Q5 is connected between the first-level power supply and the corresponding power supply port in series). The charging protocol control unit 41 turns on the first switch Q1 and turns off the second switch Q2 through the voltage conversion controller 211. The second-level power supply connected to the USB power supply port 31 operates in the pass through mode. At this time, the output voltage of the second-level power supply 21 is equal to the input voltage. That is to say, V1=VS. According to the voltage that the USB power supply port 31 needs (i.e., the requirement for supplying electricity), the charging protocol control unit 41 adjusts the output voltage VS of the first-level power supply 1 through the voltage regulation circuit of the first-level power supply 1.

When the USB power supply port 33 operates and the USB power supply port 31 does not operate, the charging protocol control unit 41 turns off the second-level power supply 21 connected to the USB power supply port 31. The first switch Q1 and the second switch Q2 are turned off. The charging protocol control unit 41 turns on the switch Q5, such that the output voltage is equal to the input voltage. That is to say, V3=VS. According to the voltage that the USB power supply port 33 needs (i.e., the requirement for supplying electricity), the charging protocol control unit 41 adjusts the output voltage VS of the first-level power supply 1 through the voltage regulation circuit of the first-level power supply 1.

When the USB power supply ports 31 and 33 both operate, the charging protocol control unit 41 connected to the USB power supply port 31 controls the voltage conversion controller 211 to operate in the switching power mode and adjusts the output voltage to a second fixed voltage (such as 5 V). For example, V1=5V. According to the voltage that the USB power supply port 33 needs (i.e., the requirement for supplying electricity), the charging protocol control unit 41 adjusts the output voltage VS of the first-level power supply 1 through the voltage regulation circuit of the first-level power supply 1. At this time, VS=V3.

In the foregoing embodiments, "equal" means "the same" or "similar" (e.g., VS=V3, V1=5V, VS=24V, V1=VS, V2=VS, VS=24V, V1=VS, and V3=VS).

In an embodiment of the present invention, an electronic device is provided, which includes the processing with multiple power supply ports used in the foregoing embodiments.

According to the embodiments provided above, the processing circuit with multiple power supply ports and the electronic device are provided. The second-level power supply operates in the switching power mode or the pass through mode. In the pass through mode, the output voltage of the second-level power supply matches the input voltage received by the first-level power supply, and the output voltage is not adjustable. Thus, in the pass through mode, the second-level power supply cannot produce the switching loss of voltage conversion and corresponding heat. In the present invention, when the power supply port of a single second-level power supply works, the second-level power supply is immediately controlled to operate in the pass through mode. Besides, the first-level power supply is controlled to satisfy the requirement for supplying electricity. As a result, the present invention can immediately and precisely implement the switching activity, effectively satisfy the requirement for supplying electricity, and decrease loss and heat.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A processing circuit with multiple power supply ports, comprising N power supply ports, a first-level power supply, N middle transmission modules, and a charging protocol control module, wherein N is an integer larger than or equal to 2;
the middle transmission module is connected between the first-level power supply and a corresponding power supply port, at least one of the middle transmission modules is used as a second-level power supply, and the charging protocol control module is respectively connected to the first-level power supply, the N power supply ports, and the N middle transmission modules;
the second-level power supply operates in a switching power mode or a pass through mode;
wherein in the switching power mode, an output voltage of the second-level power supply is less than an input voltage received by the first-level power supply, and the output voltage of the second-level power supply is adjustable;
wherein in the pass through mode, an output voltage of the second-level power supply matches an input voltage received by the first-level power supply, and the output voltage of the second-level power supply is not adjustable;
wherein when a $1^{st}$ second-level power supply of at least one second-level power supply is connected to a first device that needs electricity through the corresponding power supply port and the remaining middle transmission modules are not connected to a device that needs electricity through the corresponding power supply ports, the charging protocol control module controls the $1^{st}$ second-level power supply to operate in the pass through mode and adjusts an output voltage of the first-level power supply according to power supply requirements of the first device.

2. The processing circuit with multiple power supply ports according to claim 1, wherein when the charging protocol control module controls the $1^{st}$ second-level power supply to operate in the pass through mode, the charging protocol control module turns off the remaining middle transmission modules, such that the corresponding power supply ports do not receive electricity of the first-level power supply.

3. The processing circuit with multiple power supply ports according to claim 2, wherein the number of the second-level power supply is multiple, and when two $2^{nd}$ second-level power supplies of multiple second-level power supplies are respectively connected to different second devices requiring power supply through the corresponding power supply ports, the charging protocol control module controls the two $2^{nd}$ second-level power supplies to operate in the switching power mode and adjusts an output voltage of the corresponding second-level power supply according to electricity that the second device needs.

4. The processing circuit with multiple power supply ports according to claim 1, wherein the charging protocol control module comprises at least one charging protocol control unit respectively connected to the first-level power supply, a corresponding second-level power supply, and a power supply port corresponding to the second-level power supply;
a first control unit of the at least one charging protocol control unit is configured to determine device-access states of the N power supply ports, wherein the device-access states determine whether the corresponding power supply ports are connected to devices requiring power supply;
when the power supply port connected to the first control unit is connected to the first device and remains of the N power supply ports are not connected to devices requiring power supply, the first control unit controls a second-level power supply connected to the first control unit to operate in the pass through mode and adjusts an output voltage of the first-level power supply according to power supply requirements of the first device.

5. The processing circuit with multiple power supply ports according to claim 4, wherein when the first control unit determines device-access states of the N power supply ports and when the power supply port connected to the first control unit and another of the N power supply ports are respectively connected to different devices requiring power supply, the first control unit controls a second-level power supply connected to the first control unit to operate in the switching power mode, obtains a present demand of supplying electricity, and adjusts an output voltage of a second-level power supply connected to the first control unit according to the present demand of supplying electricity, wherein the present demand of supplying electricity represents a demand of supplying electricity of a device connected to the first control unit through the power supply port.

6. The processing circuit with multiple power supply ports according to claim 5, wherein the number of the second-level power supply is multiple, and when two $2^{nd}$ second-level power supplies of multiple second-level power supplies are respectively connected to different second devices requiring power supply through the corresponding power supply ports, the charging protocol control module controls the two $2^{nd}$ second-level power supplies to operate in the switching power mode and adjusts an output voltage of the corresponding second-level power supply according to electricity that the second device needs.

7. The processing circuit with multiple power supply ports according to claim 4, wherein the first control unit directly obtains device-access states of at least a part of the power supply ports from the corresponding power supply port.

8. The processing circuit with multiple power supply ports according to claim 7, wherein the number of the second-level power supply is multiple, and when two $2^{nd}$ second-level power supplies of multiple second-level power supplies are respectively connected to different second devices requiring power supply through the corresponding power supply ports, the charging protocol control module controls the two $2^{nd}$ second-level power supplies to operate in the switching power mode and adjusts an output voltage of the corresponding second-level power supply according to electricity that the second device needs.

9. The processing circuit with multiple power supply ports according to claim 4, wherein the first control unit obtains device-access states of a part of the power supply ports from a remaining charging protocol control unit.

10. The processing circuit with multiple power supply ports according to claim 9, wherein the number of the second-level power supply is multiple, and when two $2^{nd}$ second-level power supplies of multiple second-level power supplies are respectively connected to different second devices requiring power supply through the corresponding power supply ports, the charging protocol control module controls the two $2^{nd}$ second-level power supplies to operate in the switching power mode and adjusts an output voltage of the corresponding second-level power supply according to electricity that the second device needs.

11. The processing circuit with multiple power supply ports according to claim 4, wherein the number of the second-level power supply is multiple, and when two $2^{nd}$ second-level power supplies of multiple second-level power supplies are respectively connected to different second devices requiring power supply through the corresponding power supply ports, the charging protocol control module controls the two $2^{nd}$ second-level power supplies to operate in the switching power mode and adjusts an output voltage of the corresponding second-level power supply according to electricity that the second device needs.

12. The processing circuit with multiple power supply ports according to claim 1, wherein the number of the second-level power supply is multiple, and when two $2^{nd}$ second-level power supplies of multiple second-level power supplies are respectively connected to different second devices requiring power supply through the corresponding power supply ports, the charging protocol control module controls the two $2^{nd}$ second-level power supplies to operate in the switching power mode and adjusts an output voltage of the corresponding second-level power supply according to electricity that the second device needs.

13. The processing circuit with multiple power supply ports according to claim 1, wherein at least one middle transmission module of the N middle transmission modules is a switching module configured to turn on or turn off the first-level power supply and the corresponding power supply port, and when one target-switching module of at least one switching module is connected to a third device that needs electricity through the corresponding power supply port, the charging protocol control module turns on the target-switching module and adjusts an output voltage of the first-level power supply according to electricity that the third device needs.

14. The processing circuit with multiple power supply ports according to claim 13, wherein when the target-switching module is connected to the third device and a $3^{rd}$ second-level power supply of at least one second-level power supply is connected to a fourth device that needs electricity, the charging protocol control module controls the $3^{rd}$ second-level power supply to operate in the switching power mode and adjusts an output voltage of the $3^{rd}$ second-level power supply to a fixed voltage.

15. The processing circuit with multiple power supply ports according to claim 13, wherein the fixed voltage is determined by a minimum power voltage that a device needs.

16. The processing circuit with multiple power supply ports according to claim 13, wherein the charging protocol control module comprises at least one charging protocol control unit, a second control unit of the at least one charging protocol control unit is connected to a second-level power supply and a switching module, the second control unit is configured to determine device-access states of the N power supply ports, the device-access states determine whether the corresponding power supply ports are connected to devices requiring power supply, and when the switching module connected to the second control unit is connected to the third device through the corresponding power supply port, the second control unit turns on the switching module connected to the second control unit and adjusts an output voltage of the first-level power supply according to electricity that the third device needs.

17. The processing circuit with multiple power supply ports according to claim 16, wherein when the second control unit determines device-access states of the N power supply ports, the switching module connected to the second control unit is connected to the third device that needs electricity, the second-level power supply connected to the second control unit is connected to a fourth device that needs electricity, the second control unit controls the second-level power supply connected the second control unit to operate in the switching power mode and adjusts an output voltage of the second-level power supply connected to the second control unit to a fixed voltage.

18. The processing circuit with multiple power supply ports according to claim 1, wherein the second-level power supply comprises a voltage conversion controller, a first switch, a second switch, an inductor, and a capacitor;
the voltage conversion controller is connected to the charging protocol control module, a control terminal of the first switch, and a control terminal of the second switch, a first terminal of the first switch is connected to an output of the first-level power supply, a second terminal of the first switch is connected to a first terminal of the inductor, a second terminal of the inductor and a first terminal of the capacitor are connected to the corresponding power supply ports, a first terminal of the second switch is connected to the first terminal of the inductor, and a second terminal of the second switch is connected to a second terminal of the capacitor;
when the second-level power supply operates in the switching power mode, the first switch and the second switch are controlled to be turned on or turned off, and ON time of the first switch and the second switch matches corresponding requirement for supplying electricity;
when the second-level power supply operates in the pass through mode, the first switch keeps to be turned on and the second switch keeps to be turned off.

19. An electronic device, comprising the processing circuit with multiple power supply ports of claim 1.

20. The electronic device according to claim 19, wherein when the charging protocol control module controls the $1^{st}$ second-level power supply to operate in the pass through mode, the charging protocol control module turns off the remaining middle transmission modules, such that the corresponding power supply ports do not receive electricity of the first-level power supply.

* * * * *